US009570930B2

(12) United States Patent
Ni

(10) Patent No.: US 9,570,930 B2
(45) Date of Patent: Feb. 14, 2017

(54) UPS ELECTRICITY SUPPLY CONTROL CIRCUIT AND UPS ELECTRICITY SUPPLY

(75) Inventor: Tong Ni, Xi'an (CN)

(73) Assignee: Emerson Netwrok Power Co., Ltd., Shenzhen, Guangdong (CN)

( * ) Notice: Subject to any disclaimer, the term of this patent is extended or adjusted under 35 U.S.C. 154(b) by 950 days.

(21) Appl. No.: 13/880,002

(22) PCT Filed: Oct. 19, 2011

(86) PCT No.: PCT/CN2011/080980
§ 371 (c)(1),
(2), (4) Date: Apr. 17, 2013

(87) PCT Pub. No.: WO2012/051945
PCT Pub. Date: Apr. 26, 2012

(65) Prior Publication Data
US 2013/0200708 A1    Aug. 8, 2013

(30) Foreign Application Priority Data
Oct. 22, 2010   (CN) .......................... 2010 1 0520653

(51) Int. Cl.
H02J 7/00      (2006.01)
H02J 9/06      (2006.01)
H02M 3/337     (2006.01)

(52) U.S. Cl.
CPC .............. *H02J 7/0068* (2013.01); *H02J 9/061* (2013.01); *H02M 3/337* (2013.01); *H02J 2009/067* (2013.01); *Y10T 307/625* (2015.04)

(58) Field of Classification Search
CPC .... H02J 7/0068; H02J 9/061; H02J 2009/067; H02M 3/337; Y10T 307/625
See application file for complete search history.

(56) References Cited

U.S. PATENT DOCUMENTS 5,513,718 A * 5/1996 Suzuki ................. B60K 6/485
                                                180/65.26
5,896,280 A    4/1999 Gucyski et al.
(Continued)

FOREIGN PATENT DOCUMENTS

CN    2454974 Y    10/2001
CN    2572644 Y    9/2003
(Continued)

OTHER PUBLICATIONS

International Search Report and Written Opinion of the ISA for PCT/CN2011/080980, ISA/CN, mailed Feb. 16, 2012.
(Continued)

*Primary Examiner* — Zeev V Kitov
(74) *Attorney, Agent, or Firm* — Harness, Dickey & Pierce, P.L.C.

(57) ABSTRACT

A UPS control circuit and a UPS is provided. The UPS includes a rechargeable battery and a UPS control circuit connected with the rechargeable battery. The UPS control circuit includes an input filtering circuit, a rectification circuit, an inversion circuit, a static transfer switch, an output filtering circuit, a control circuit, and a multipurpose DC/DC circuit connected between the rechargeable battery and an output terminal of the rectification circuit. The multipurpose DC/DC circuit is controlled by the control circuit. In a battery mode, the rechargeable battery supplies an input voltage to the inversion circuit via the multipurpose DC/DC circuit. In a mains power mode, the rechargeable battery is charged by an output voltage of the rectification circuit via the multipurpose DC/DC circuit. Therefore, no independent charging circuit is needed to charge the rechargeable battery, causing a simpler circuit structure and a lower cost, and providing greater value to the customer.

10 Claims, 11 Drawing Sheets

(56) References Cited

U.S. PATENT DOCUMENTS

| | | | |
|---|---|---|---|
| 2005/0151509 A1* | 7/2005 | Cook | H02J 1/00 |
| | | | 320/116 |
| 2007/0241616 A1 | 10/2007 | Lai et al. | |
| 2008/0238205 A1 | 10/2008 | Lee | |
| 2009/0034299 A1* | 2/2009 | Lev | H02M 3/33592 |
| | | | 363/17 |
| 2009/0290384 A1 | 11/2009 | Jungreis | |
| 2010/0231178 A1* | 9/2010 | Handa | H02J 7/0065 |
| | | | 320/163 |
| 2011/0037319 A1* | 2/2011 | Matsui | H02M 3/33584 |
| | | | 307/43 |
| 2014/0052350 A1* | 2/2014 | Tsuruga | E02F 3/325 |
| | | | 701/50 |

FOREIGN PATENT DOCUMENTS

| | | |
|---|---|---|
| CN | 101685980 A | 3/2010 |
| CN | 101976871 A | 2/2011 |
| CN | 101976871 B | 3/2013 |
| EP | 1005132 A2 | 5/2000 |
| EP | 1355403 A2 | 10/2003 |
| EP | 2048756 A2 | 4/2009 |
| JP | 2001-275276 A | 10/2001 |
| NZ | 332613 A | 6/2000 |

OTHER PUBLICATIONS

First Chinese Office Action regarding Application No. 201010520653.4, dated Jul. 4, 2012. Translation provided by Unitalen Attorneys at Law.

Extended European Search Report regarding Application No. 11833851.6 dated Oct. 27, 2016.

* cited by examiner

UPS ELECTRICITY SUPPLY CONTROL CIRCUIT AND UPS ELECTRICITY SUPPLY

This application is the national phase of International Application No. PCT/CN2011/080980, titled "UPS ELECTRICITY SUPPLY CONTROL CIRCUIT AND UPS ELECTRICITY SUPPLY", filed on Oct. 19, 2011 which claims the benefit of Chinese patent application No. 201010520653.4 titled "UPS electricity supply control circuit and UPS electricity supply" and filed with the Chinese State Intellectual Property Office on Oct. 22, 2010, the entire disclosures of which are incorporated herein by reference.

FIELD

The present invention relates to the field of power supplies, and more particularly to an Uninterruptible power supply (UPS) control circuit and a UPS.

BACKGROUND

Generally, the designs of conventional UPSs can be classified into the following two categories.

UPSs with isolation generally use flyback conversion, or in some cases two-switch forward conversion.

UPSs without isolation may use a buck circuit as a step-down converter, or a buck-boost circuit as a step-down/step-up converter.

These conventional UPSs are designed with separately arranged chargers. In a UPS, the charger is an independent component regardless of how it is connected to the UPS.

FIG. 1 is a block diagram illustrating a first conventional UPS. As shown in FIG. 1, the UPS includes an input filtering circuit 1, a rectification circuit 2, an inversion circuit 3, a static transfer switch 4, an output filtering circuit 5, a control circuit 6, an auxiliary circuit 7, an DC/DC circuit A, a rechargeable battery B and a charging circuit C. Specifically, the input filtering circuit 1, the rectification circuit 2, the inversion circuit 3, the static transfer switch 4 and the output filtering circuit 5 are connected sequentially; and the output terminal of the input filtering circuit 1 is connected with the input terminal of the static transfer switch 4. The charging circuit C is connected between the rechargeable battery B and the output terminal of the input filtering circuit 1. The DC/DC circuit A is connected between the rechargeable battery B and the output terminal of the rectification circuit 2. The DC/DC circuit A, the rectification circuit 2, the inversion circuit 3 and the static transfer switch 4 are all controlled by the control circuit 6. Moreover, the rechargeable battery B powers the auxiliary circuit 7. In a mains power mode of the UPS, the rechargeable battery B is charged, by the mains power via the input filtering circuit 1 and then the charging circuit C. In a battery mode of the UPS, the rechargeable battery B is discharged, via the DC/DC circuit A to supply an input voltage to the inversion circuit 3.

FIG. 2 is a block diagram illustrating a second conventional UPS. As shown in FIG. 2, the second UPS differs from the first UPS in that: the charging circuit C is connected between the rechargeable battery B and the output terminal of the rectification circuit 2. Similarly, in a mains power mode of the UPS, the rechargeable battery B is charged, by the mains power via the input filtering circuit 1, the rectification circuit 2 and then the charging circuit C; in a battery mode of the UPS, the rechargeable battery B is discharged, via the DC/DC circuit A to supply an input voltage to the inversion circuit 3.

As can be seen, in the conventional UPSs, the rechargeable battery B is charged using an independent charging circuit C, causing a complex circuit structure and a higher cost.

SUMMARY

In view of the disadvantages in the prior art that the conventional UPSs charges the rechargeable battery using an independent charging circuit, causing a complex circuit structure and a higher cost of the UPS, a technical problem to be solved by the present invention is to provide a UPS control circuit and a UPS.

In order to achieve the above object, according to the present invention, there is provided a UPS control circuit connected with a rechargeable battery including an input filtering circuit, a rectification circuit, an inversion circuit, a static transfer switch, an output filtering circuit, a control circuit, and an auxiliary circuit, the input filtering circuit, the rectification circuit, the inversion circuit, the static transfer switch, and the output filtering circuit being connected sequentially, an output terminal of the input filtering circuit being connected with an input terminal of the static transfer switch, and the rectification circuit, the inversion circuit, and the static transfer switch all being controlled by the control circuit, the UPS control circuit further includes a multipurpose DC/DC circuit connected between an output terminal of the rectification circuit and the rechargeable battery, and the multipurpose DC/DC circuit is controlled by the control circuit, so that in a battery mode, the rechargeable battery supplies an input voltage to the inversion circuit via the multipurpose DC/DC circuit; and in a mains power mode, the rechargeable battery is charged by an output voltage of the rectification circuit via the multipurpose DC/DC circuit.

In the above UPS control circuit according to the present invention, the multipurpose DC/DC circuit may include a battery/mains power selector switch and an isolation transformer, a primary side of the isolation transformer is provided with a first switching transistor group, a first rectification circuit, and a first filter capacitor group, and a secondary side of the isolation transformer is provided with a second switching transistor group, a second rectification circuit, and a second filter capacitor group, the battery/mains power selector switch is a manually-operated switch, or an electrically-operated switch controlled by the control circuit, when the battery mode is selected by the battery/mains power selector switch, the control circuit controls the first switching transistor group to be rapidly switched between on and off, so that an output voltage of the rechargeable battery is converted into a first AC voltage, which is applied to the primary side of the isolation transformer, resulting in a second AC voltage on the secondary side of the isolation transformer; at the same time, the control circuit controls the second switching transistor group to be turned off, so that the second AC voltage is converted into a DC voltage via the second rectification circuit and the second filter capacitor group, to supply an input voltage to the inversion circuit, and when the mains power mode is selected by the battery/mains power selector switch, the control circuit controls the second switching transistor group to be rapidly switched between on and off, so that an output voltage of the rectification circuit is converted into a third AC voltage, which is applied to the secondary side of the isolation transformer, resulting in a fourth AC voltage on the primary side of the isolation transformer, and the fourth AC voltage is converted into a DC voltage via the first rectification circuit and the first filter capacitor group, to charge the rechargeable battery.

In the above UPS control circuit according to the present invention, the first switching transistor group may include a first switching transistor and a second switching transistor, each of the first switching transistor and the second switching transistor includes a body diode, the first rectification circuit is a half-wave rectification circuit formed by the body diode of the first switching transistor and the body diode of the second switching transistor, the first filter capacitor group may include a first capacitor, the second switching transistor group may include a third switching transistor and a fourth switching transistor, the second rectification circuit may be a bridge rectifier, and the second filter capacitor group may include a third capacitor and a fourth capacitor, an anode of the rechargeable battery is connected to a center tap of the primary winding of the isolation transformer via the battery/mains power selector switch, a cathode of the rechargeable battery is connected to a dotted terminal of the primary winding of the isolation transformer via the first switching transistor, and is connected to a non-dotted terminal of the primary winding of the isolation transformer via the second switching transistor, and the first capacitor is connected between the center tap of the primary winding of isolation transformer and the cathode of the rechargeable battery, and a dotted terminal of the secondary winding of the isolation transformer is connected to a positive input terminal of the bridge rectifier, a non-dotted terminal of the secondary winding of the isolation transformer is connected to a negative input terminal of the bridge rectifier, a positive output terminal of the bridge rectifier is connected to a negative output terminal of the bridge rectifier via the third switching transistor and then the fourth switching transistor, with an intersection of the third switching transistor and the fourth switching transistor connected to the non-dotted terminal or the dotted terminal of the secondary winding of the isolation transformer, and the positive output terminal of the bridge rectifier is also connected to the negative output terminal of the bridge rectifier via the third capacitor and then the fourth capacitor, with an intersection of the third capacitor and the fourth capacitor connected to a center tap of the secondary winding of the isolation transformer.

In the above UPS control circuit according to the present invention, the second switching transistor group may further include a fifth switching transistor and a sixth switching transistor, and the positive output terminal of the bridge rectifier is connected to the negative output terminal of the bridge rectifier via the fifth switching transistor and the sixth switching transistor, with an intersection of the fifth switching transistor and the sixth switching transistor connected to the non-dotted terminal of the secondary winding of the isolation transformer.

In the above UPS control circuit according to the present invention, the multipurpose DC/DC circuit may include an isolation transformer, a primary side of the isolation transformer is provided with a first switching transistor group, a first rectification circuit, and a first filter capacitor group, and a secondary side of the isolation transformer is provided with a second switching transistor group, a second rectification circuit, and a second filter capacitor group, in the battery mode, the control circuit controls the first switching transistor group to be rapidly switched between on and off, so that an output voltage of the rechargeable battery is converted into a first AC voltage, which is applied to the primary side of the isolation transformer, resulting in a second AC voltage on the secondary side of the isolation transformer; at the same time, the control circuit controls the second switching transistor group to be turned off, so that the second AC voltage is converted into a DC voltage via the second rectification circuit and the second filter capacitor group, to supply an input voltage to the inversion circuit; and in the mains power mode, the control circuit controls the second switching transistor group to be rapidly switched between on and off, so that an output voltage of the rectification circuit is converted into a third AC voltage, which is applied to the secondary side of the isolation transformer, resulting in a fourth AC voltage on the primary side of the isolation transformer, and the fourth AC voltage is converted into a DC voltage via the first rectification circuit and the first filter capacitor group, to charge the rechargeable battery.

In the above UPS control circuit according to the present invention, the first switching transistor group may include a first switching transistor, a second switching transistor, a third switching transistor, and a fourth switching transistor, each of the first switching transistor, the second switching transistor, the third switching transistor, and the fourth switching transistor includes a body diode, the first rectification circuit is a full-wave rectification circuit formed by the body diode of the first switching transistor, the body diode of the second switching transistor, the body diode of the third switching transistor, and the body diode of the fourth switching transistor, the first filter capacitor group may include a first capacitor, the second switching transistor group may include a fifth switching transistor and a sixth switching transistor, the second rectification circuit may be a bridge rectifier, and the second filter capacitor group may include a third capacitor and a fourth capacitor, an anode of the rechargeable battery is connected to a cathode of the rechargeable battery via the first switching transistor and the second switching transistor, and the anode of the rechargeable battery is also connected to the cathode of the rechargeable battery via the third switching transistor and the fourth switching transistor, with an intersection of the first switching transistor and the second switching transistor connected to a dotted terminal of the primary winding of the isolation transformer, and an intersection of the third switching transistor and the fourth switching transistor connected to a non-dotted terminal of the primary winding of the isolation transformer, and the first capacitor is connected between the anode and the cathode of the rechargeable battery, and a dotted terminal of the secondary winding of the isolation transformer is connected to a positive input terminal of the bridge rectifier, a non-dotted terminal of the secondary winding of the isolation transformer is connected to a negative input terminal of the bridge rectifier, a positive output terminal of the bridge rectifier is connected to a negative output terminal of the bridge rectifier via the fifth switching transistor and then the sixth switching transistor, with an intersection of the fifth switching transistor and the sixth switching transistor connected to the non-dotted terminal or the dotted terminal of the secondary winding of the isolation transformer, and the positive output terminal of the bridge rectifier is connected to the negative output terminal of the bridge rectifier via the third capacitor and then the fourth capacitor, with an intersection of the third capacitor and the fourth capacitor connected to a center tap of the secondary winding of the isolation transformer.

In the above UPS control circuit according to the present invention, the second switching transistor group may further include a seventh switching transistor and an eighth switching transistor, and the positive output terminal of the bridge rectifier is connected to the negative output terminal of the bridge rectifier via the seventh switching transistor and the eighth switching transistor, with an intersection of the seventh switching transistor and the eighth switching transistor connected to the non-dotted terminal of the secondary winding of the isolation transformer.

In the above UPS control circuit according to the present invention, the multipurpose DC/DC circuit may include an isolation transformer, a primary side of the isolation transformer is provided with a first switching transistor group, a first rectification circuit, a first filter capacitor group, and a resonant circuit, and a secondary side of the isolation transformer is provided with a second switching transistor group, a second rectification circuit, and a second filter capacitor group, in the battery mode, the control circuit controls the first switching transistor group to be rapidly switched between on and off, so that an output voltage of the rechargeable battery is converted via the resonant circuit into a first AC voltage, which is applied to the primary side of the isolation transformer, resulting in a second AC voltage on the secondary side of the isolation transformer; at the same time, the control circuit controls the second switching transistor group to be turned off, so that the second AC voltage is converted into a DC voltage via the second rectification circuit and the second filter capacitor group, to supply an input voltage to the inversion circuit, and in the mains power mode, the control circuit controls the second switching transistor group to be rapidly switched between on and off, so that an output voltage of the rectification circuit is converted into a third AC voltage, which is applied to the secondary side of the isolation transformer, resulting in a fourth AC voltage on the primary side of the isolation transformer, and the fourth AC voltage is converted into a DC voltage via the resonant circuit, the first rectification circuit, and the first filter capacitor group, to charge the rechargeable battery.

In the above UPS control circuit according to the present invention, the first switching transistor group may include a first switching transistor, a second switching transistor, a third switching transistor, and a fourth switching transistor, the first filter capacitor group may include a first capacitor, the first rectification circuit may include a charging capacitor and an induction coil, the second switching transistor group may include a fifth switching transistor and a sixth switching transistor, the second rectification circuit may be a bridge rectifier, and the second filter capacitor group may include a third capacitor and a fourth capacitor, an anode of the rechargeable battery is connected to a cathode of the rechargeable battery via the first switching transistor and the second switching transistor, and the anode of the rechargeable battery is also connected to the cathode of the rechargeable battery via the third switching transistor and the fourth switching transistor, with an intersection of the first switching transistor and the second switching transistor connected to a dotted terminal of the primary winding of the isolation transformer via the charging capacitor and then the induction coil, and an intersection of the third switching transistor and the fourth switching transistor connected to a non-dotted terminal of the primary winding of the isolation transformer, and the first capacitor is connected between the anode and the cathode of the rechargeable battery, and a dotted terminal of the secondary winding of the isolation transformer is connected to a positive input terminal of the bridge rectifier, a non-dotted terminal of the secondary winding of the isolation transformer is connected to a negative input terminal of the bridge rectifier, a positive output terminal of the bridge rectifier is connected to a negative output terminal of the bridge rectifier via the fifth switching transistor and then the sixth switching transistor, with an intersection of the fifth switching transistor and the sixth switching transistor connected to the non-dotted terminal or the dotted terminal of the secondary winding of the isolation transformer, and the positive output terminal of the bridge rectifier is connected to the negative output terminal of the bridge rectifier via the third capacitor and then the fourth capacitor, with an intersection of the third capacitor and the fourth capacitor connected to a center tap of the secondary winding of the isolation transformer.

According to the present invention, there is also provided a UPS including a rechargeable battery and a UPS control circuit connected with the rechargeable battery, the UPS control circuit being any one of the above UPS control circuits.

The UPS control circuit and the UPS according to the present invention may bring about the following advantages. A multipurpose DC/DC circuit is connected between an output terminal of a rectification circuit and a rechargeable battery, so that in a mains power mode, the rechargeable battery is charged by the mains power via an input filtering circuit, the rectification circuit, and the multipurpose DC/DC circuit; and in a battery mode, the rechargeable battery supplies an input voltage to an inversion circuit via the multipurpose DC/DC circuit. Therefore, the multipurpose DC/DC circuit incorporates the charging and discharging functions, eliminating the need for an independent charging circuit to charge the rechargeable battery, resulting in a simpler circuit structure and a lower cost, and providing greater value to the customer.

BRIEF DESCRIPTION OF DRAWINGS

The present invention will be described hereinafter in conjunction with the accompanying drawings and the embodiments. In the drawings.

DESCRIPTION OF EMBODIMENTS

For a better understanding, the UPS control circuit and the UPS according to the present invention are described below in detail in conjunction with the accompanying drawings.

Figure 1:
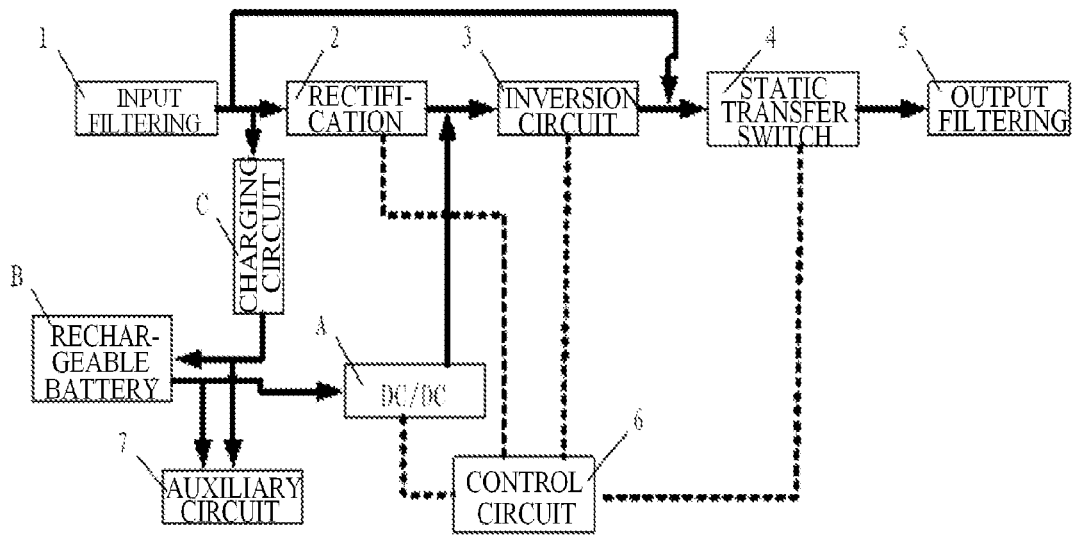
FIG. 1 is a block diagram illustrating a first conventional UPS.
Figure 2:
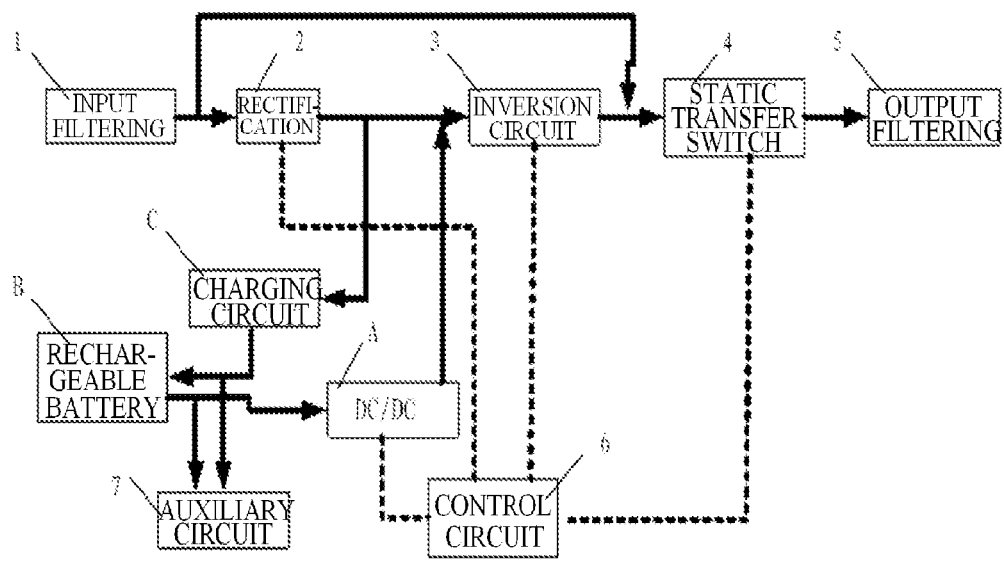
FIG. 2 is a block diagram illustrating a second conventional UPS.
Figure 3:
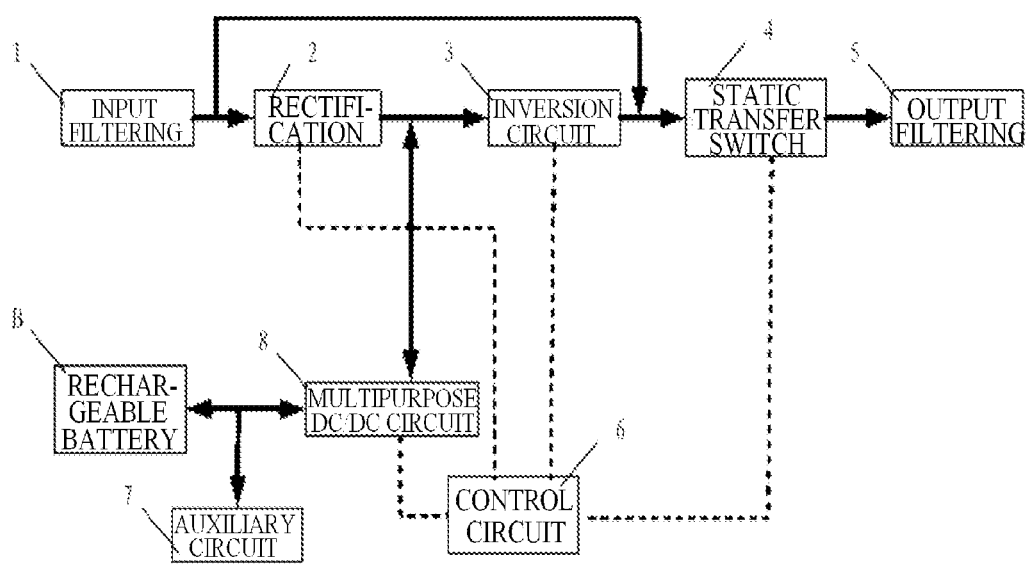
FIG. 3 is a block diagram illustrating a UPS according to the present invention.

FIG. 3 is a block diagram illustrating a UPS according to the present invention.

As shown in FIG. 3, the UPS according to the embodiment of the present invention includes a rechargeable battery B and a UPS control circuit connected with the rechargeable battery B. The UPS control circuit includes an input filtering circuit 1, a rectification circuit 2, an inversion circuit 3, a static transfer switch 4, an output filtering circuit 5, a control circuit 6, and a multipurpose DC/DC circuit 8.

The input filtering circuit 1, the rectification circuit 2, the inversion circuit 3, the static transfer switch 4, and the output filtering circuit 5 are connected sequentially, and an output terminal of the input filtering circuit 1 is connected with an input terminal of the static transfer switch 4. The rectification circuit 2, the inversion circuit 3, the static transfer switch 4, and the multipurpose DC/DC circuit 8 are all connected with and controlled by the control circuit 6.

The multipurpose DC/DC circuit is connected between the output terminal of the rectification circuit 2 and the rechargeable battery B. In a battery mode, the rechargeable battery supplies an input voltage to the inversion circuit 3 via the multipurpose DC/DC circuit 8. In a mains power mode, the rechargeable battery B is charged by an output voltage of the rectification circuit 2 via the multipurpose DC/DC circuit 8.

In the UPS control circuit according to the embodiment of the present invention, the multipurpose DC/DC circuit 8 is connected between the output terminal of the rectification circuit 2 and the rechargeable battery B, and the multipurpose DC/DC circuit 8 is connected with and controlled by the control circuit 6. In the mains power mode, the rechargeable battery is charged by the mains power via the input filtering circuit 1, the rectification circuit 2, and the multipurpose DC/DC circuit 8. In the battery mode, the rechargeable battery supplies an input voltage to the inversion circuit 3 via the multipurpose DC/DC circuit 8. The multipurpose DC/DC circuit 8 incorporates the charging and discharging functions, eliminating the need for an independent charging circuit to charge the rechargeable battery B, resulting in a simpler circuit structure and a lower cost of the UPS control circuit, and providing greater value to the customer.

The UPS according to the embodiment of the present invention may further include an auxiliary circuit 7 arranged between the multipurpose DC/DC circuit 8 and the rechargeable battery B.

Figure 4:
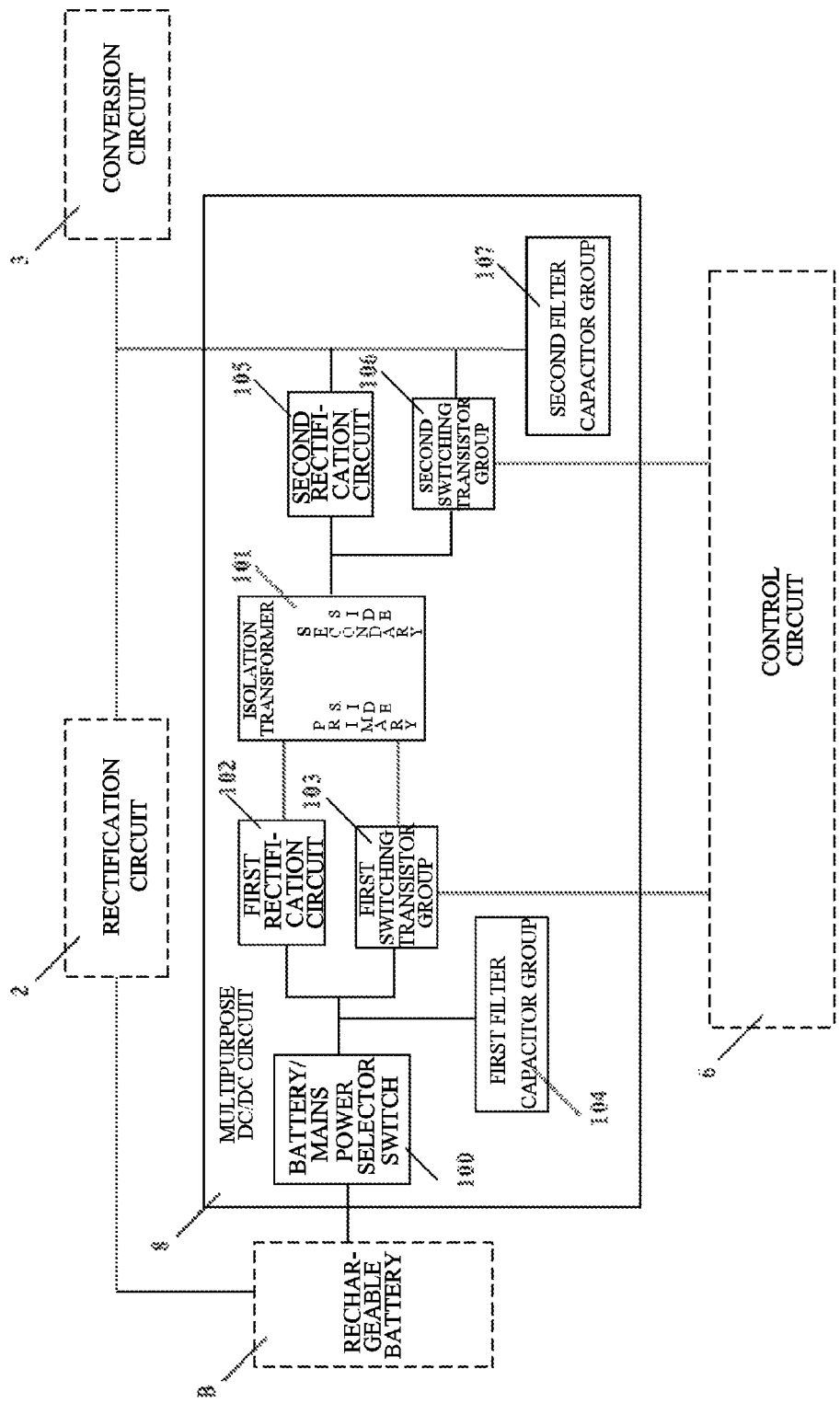
FIG. 4 is a block diagram illustrating a multipurpose DC/DC circuit according to a first embodiment of the present invention.

FIG. 4 is a block diagram illustrating a multipurpose DC/DC circuit according to a first embodiment of the present invention. As shown in FIG. 4, in the first embodiment, the multipurpose DC/DC circuit 8 includes a battery/mains power selector switch 100 and an isolation transformer 101. A primary side of the isolation transformer 101 is provided with a first switching transistor group 103, a first rectification circuit 102, and a first filter capacitor group 104. A secondary side of the isolation transformer 101 is provided with a second switching transistor group 106, a second rectification circuit 105, and a second filter capacitor group 107. The first switching transistor group 103 and the second switching transistor group 106 are all controlled by the control circuit 6.

Specifically, the output terminal of the rechargeable battery B is connected to the primary side of the isolation transformer 101 via the battery/mains power selector switch 100 and then the first rectification circuit 102. Meanwhile, the output terminal of the rechargeable battery B is also connected to the primary side of the isolation transformer 101 via the battery/mains power selector switch 100 and then the first switching transistor group 103. Moreover, the first filter capacitor group 104 is connected to the output terminal of the battery/mains power selector switch 100 (i.e., the intersection between the battery/mains power selector switch 100 and the first rectification circuit 102). The secondary side of the isolation transformer 101 is connected to the input terminal of a conversion circuit 3 (i.e., the inversion circuit 3 in FIG. 3) via the second rectification circuit 105. Meanwhile, the secondary side of the isolation transformer 101 is also connected to the input terminal of the conversion circuit 3 via the second switching transistor group 106. The second filter capacitor group 107 is connected to the input terminal of the conversion circuit 3.

When the battery mode is selected by the battery/mains power selector switch 100, the control circuit 6 controls the first switching transistor group 103 to be rapidly switched between on and off, so that an output voltage of the rechargeable battery B is converted into a first AC voltage, which is applied to the primary side of the isolation transformer 101, resulting in a second AC voltage on the secondary side of the isolation transformer 101. At the same time, the control circuit 6 controls the second switching transistor group 106 to be turned off, so that the second AC voltage is converted into a DC voltage via the second rectification circuit 105 and the second filter capacitor group 107, to supply an input voltage to the conversion circuit 3.

When the mains power mode is selected by the battery/mains power selector switch 100, the control circuit 6 controls the second switching transistor group 106 to be rapidly switched between on and off, so that an output voltage of the rectification circuit 2 is converted into a third AC voltage, which is applied to the secondary side of the isolation transformer 101, resulting in a fourth AC voltage on the primary side of the isolation transformer 101. The fourth AC voltage is converted into a DC voltage via the first rectification circuit 102 and the first filter capacitor group 104, to charge the rechargeable battery B.

The battery/mains power selector switch 100 may be a manually-operated switch, or an electrically-operated switch controlled by the control circuit 6.

Figure 5:
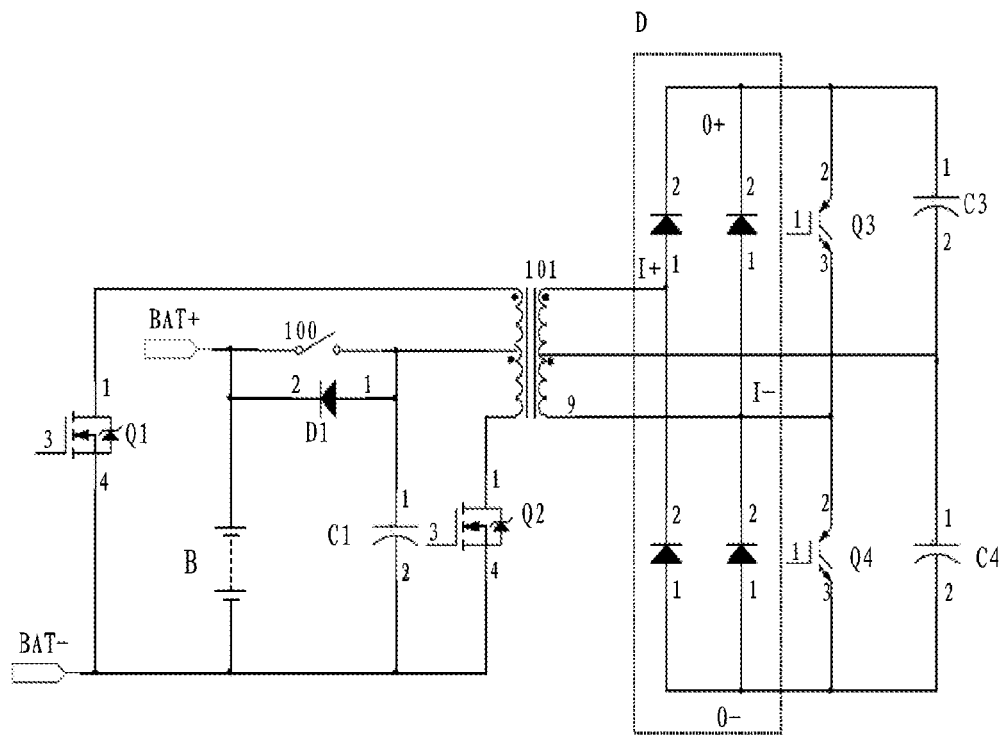
FIG. 5 is a circuit diagram illustrating a first preferred embodiment of FIG. 4.

FIG. 5 is a circuit diagram illustrating a first preferred embodiment of FIG. 4.

As shown in FIG. 5 and FIG. 4, in the first preferred embodiment, the first switching transistor group 103 includes a first switching transistor Q1 and a second switching transistor Q2. Each of the first switching transistor Q1 and the second switching transistor Q2 includes a body diode. The first rectification circuit 102 is a half-wave rectification circuit formed by the body diode of the first switching transistor Q1 and the body diode of the second switching transistor Q2. The first filter capacitor group 104 includes a first capacitor C1. The second switching transistor group 106 includes a third switching transistor Q3 and a fourth switching transistor Q4. The second rectification circuit 105 is a bridge rectifier D. The second filter capacitor group 107 includes a third capacitor C3 and a fourth capacitor C4.

The anode of the rechargeable battery B is connected to a center tap of the primary winding of the isolation transformer 101 via the battery/mains power selector switch 100. The cathode of the rechargeable battery B is connected to a dotted terminal of the primary winding of the isolation transformer 101 via the first switching transistor Q1, and is connected to a non-dotted terminal of the primary winding of the isolation transformer 101 via the second switching transistor Q2. The first capacitor C1 is connected between the center tap of the primary winding of isolation transformer 101 and the cathode of the rechargeable battery B. Moreover, a first diode D1 is arranged between the center tap of the primary winding of the isolation transformer 101 and the anode of the rechargeable battery B. The anode of the first diode D1 is connected with the center tap of the primary winding of the isolation transformer 101, and the cathode of the first diode D1 is connected with the anode of the rechargeable battery B.

When the mains power mode is selected by the battery/mains power selector switch 100, the battery/mains power selector switch 100 is open, and the rechargeable battery B is charged by a charging current via the first diode D1, thereby preventing ripple which may affect the rechargeable battery B.

A dotted terminal of the secondary winding of the isolation transformer 101 is connected to a positive input terminal I+ of the bridge rectifier D. A non-dotted terminal of the secondary winding of the isolation transformer 101 is connected to a negative input terminal I− of the bridge rectifier D. A positive output terminal O+ of the bridge rectifier D is connected to a negative output terminal O− of the bridge rectifier D via the third switching transistor Q3 and then the fourth switching transistor Q4, with an intersection of the third switching transistor Q3 and the fourth switching transistor Q4 connected to the non-dotted terminal of the secondary winding of the isolation transformer 101. The positive output terminal O+ of the bridge rectifier D is also connected to the negative output terminal O− of the bridge rectifier D via the third capacitor C3 and then the fourth capacitor C4, with an intersection of the third capacitor C3 and the fourth capacitor C4 connected to a center tap of the secondary winding of the isolation transformer 101.

The battery mode is selected when the battery/mains power selector switch 100 is closed. The mains power mode is selected when the battery/mains power selector switch 100 is open.

Figure 6:
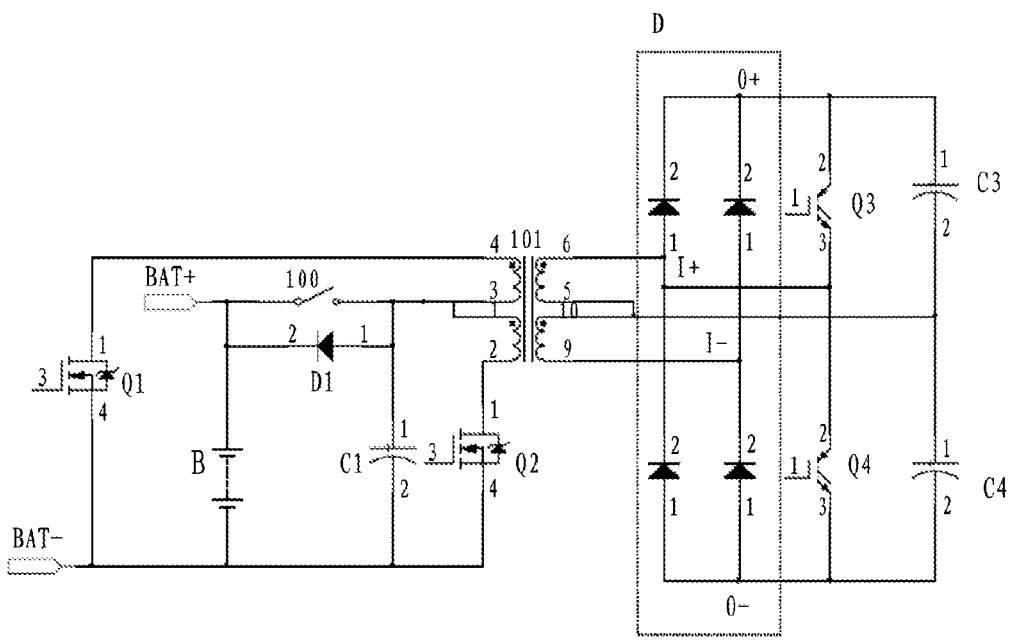
FIG. 6 is a circuit diagram illustrating a second preferred embodiment of FIG. 4.

FIG. 6 is a circuit diagram illustrating a second preferred embodiment of FIG. 4.

The second preferred embodiment differs from the first embodiment shown in FIG. 5 in that:

the intersection of the third switching transistor Q3 and the fourth switching transistor Q4 is connected to the dotted terminal of the secondary winding of the isolation transformer 101.

Figure 7:
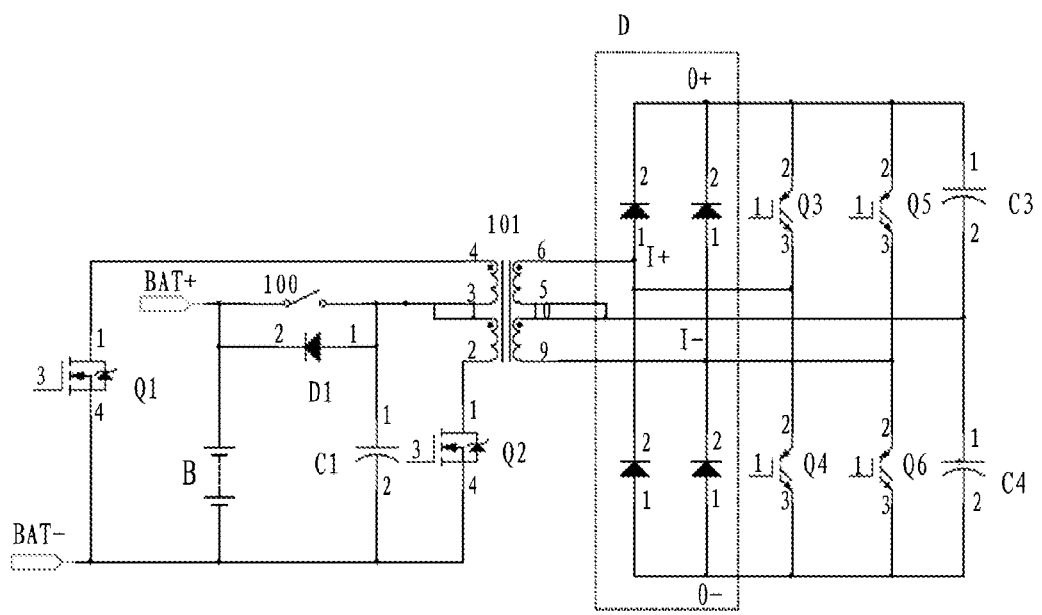
FIG. 7 is a circuit diagram illustrating a third preferred embodiment of FIG. 4.

FIG. 7 is a circuit diagram illustrating a third preferred embodiment of FIG. 4.

The third preferred embodiment differs from the second embodiment shown in FIG. 6 in that: the second switching transistor group 106 further includes a fifth switching transistor Q5 and a sixth switching transistor Q6. The positive output terminal O+ of the bridge rectifier D is connected to the negative output terminal Q− of the bridge rectifier D via the fifth switching transistor Q5 and then the sixth switching transistor Q6, with an intersection of the fifth switching transistor Q5 and the sixth switching transistor Q6 connected to the non-dotted terminal of the secondary winding of the isolation transformer 101.

Figure 8:
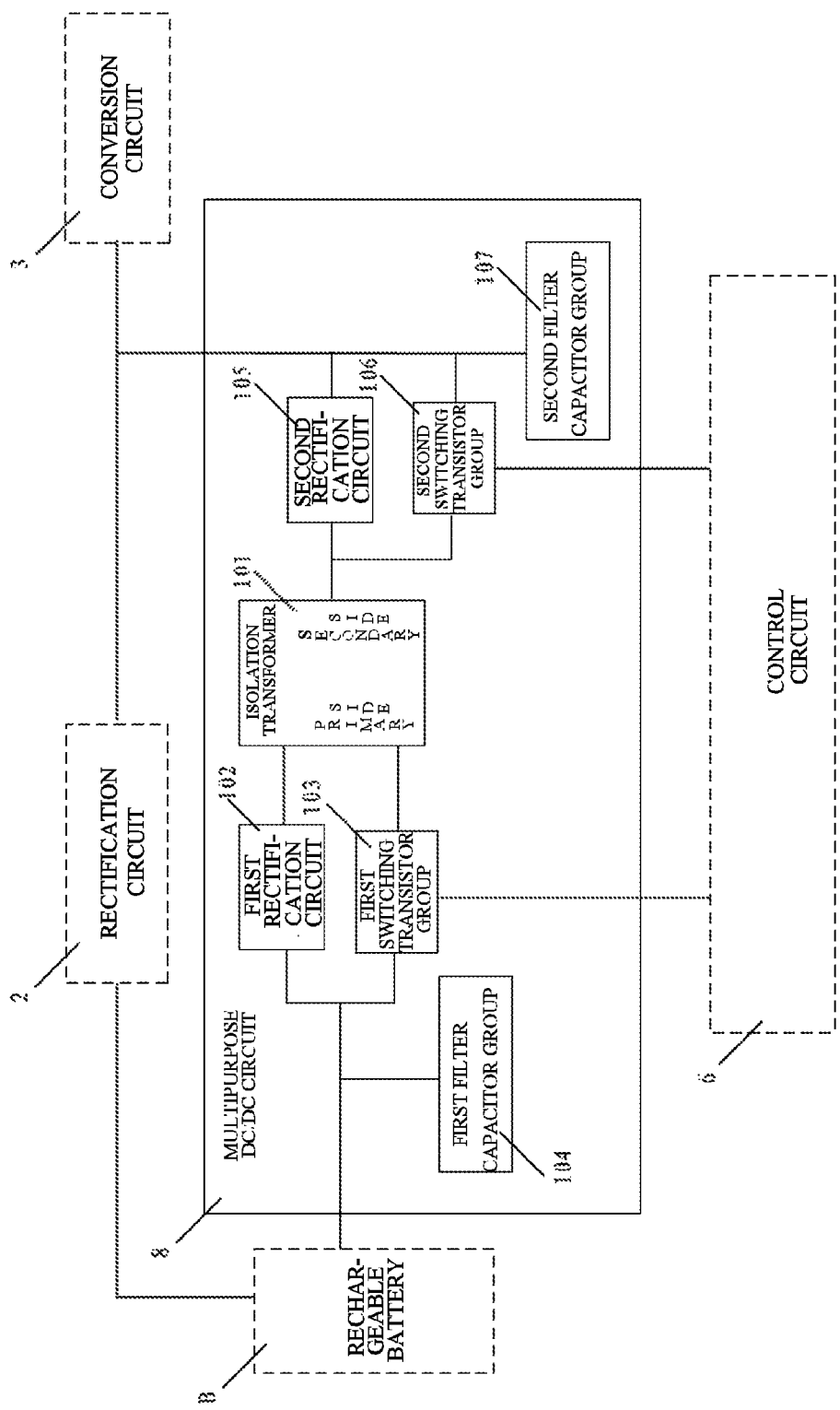
FIG. 8 is a block diagram illustrating a multipurpose DC/DC circuit according to a second embodiment of the present invention.

FIG. 8 is a block diagram illustrating a multipurpose DC/DC circuit according to a second embodiment of the present invention.

In the second embodiment of the present invention, the multipurpose DC/DC circuit 8 includes an isolation transformer 101. A primary side of the isolation transformer 101 is provided with a first switching transistor group 103, a first rectification circuit 102, and a first filter capacitor group 104. A secondary side of the isolation transformer 101 is provided with a second switching transistor group 106, a second rectification circuit 105, and a second filter capacitor group 107. Specifically, the output terminal of the rechargeable battery B is connected to the primary side of the isolation transformer 101 via the first rectification circuit 102. Meanwhile, the output terminal of the rechargeable battery B is also connected to the primary side of the isolation transformer 101 via the first switching transistor group 103. The first filter capacitor group 104 is connected to the output terminal of the rechargeable battery B. The secondary side of the isolation transformer 101 is connected to the input terminal of the conversion circuit 3 via the second rectification circuit 105. Meanwhile, the secondary side of the isolation transformer 101 is also connected to the input terminal of the conversion circuit 3 via the second switching transistor group 106. The second filter capacitor group 107 is connected to the input terminal of the conversion circuit 3.

In the battery mode, the control circuit 6 controls the first switching transistor group 103 to be rapidly switched between on and off, so that an output voltage of the rechargeable battery B is converted via the first rectification circuit 102 into a first AC voltage, which is applied to the primary side of the isolation transformer 101, resulting in a second AC voltage on the secondary side of the isolation transformer 101. At the same time, the control circuit 6 controls the second switching transistor group 106 to be turned off, so that the second AC voltage is converted into a DC voltage via the second rectification circuit 105 and the second filter capacitor group 107, to supply an input voltage to the conversion circuit 3.

In the mains power mode, the control circuit 6 controls the second switching transistor group 106 to be rapidly switched between on and off, so that an output voltage of the rectification circuit 2 is converted into a third AC voltage, which is applied to the secondary side of the isolation transformer 101, resulting in a fourth AC voltage on the primary side of the isolation transformer 101. The fourth AC voltage is converted into a DC voltage via the first rectification circuit 104 and the first filter capacitor group 102, to charge the rechargeable battery B.

In this embodiment, the control circuit 6 may automatically detect whether the mains power is in a normal state, and charge the rechargeable battery B with the mains power when the mains power is normal; and initiate the UPS to power the load in a battery mode when the mains power fails. In addition, the control circuit 6 may monitor the charge stored in the rechargeable battery B, in order to prevent overcharging and overdischarging.

Figure 9:
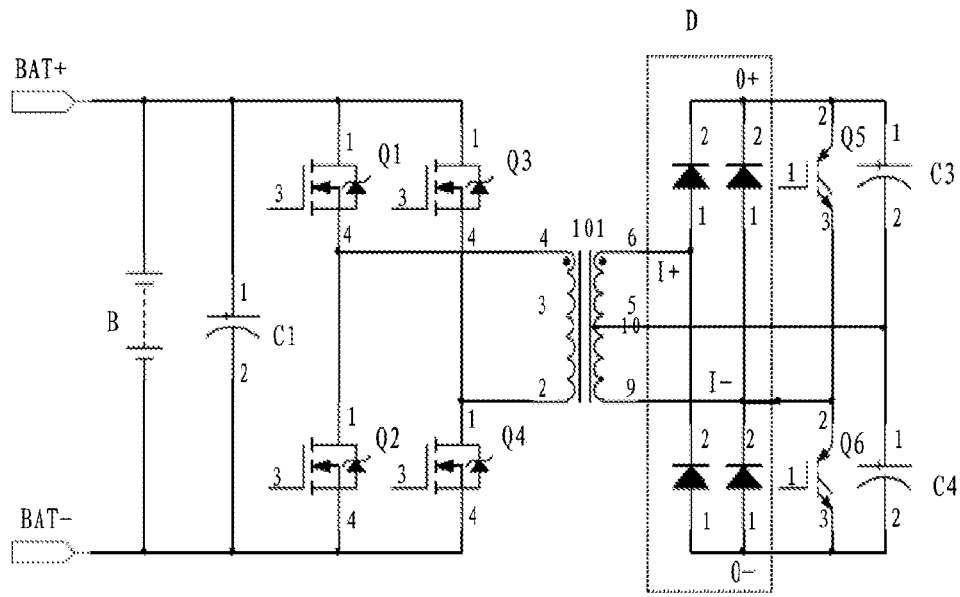
FIG. 9 is a circuit diagram illustrating a first preferred embodiment of FIG. 8.

FIG. 9 is a circuit diagram illustrating a first preferred embodiment of FIG. 8.

As shown in FIG. 9 and FIG. 8, in the first preferred embodiment, the first switching transistor group 103 includes a first switching transistor Q1, a second switching transistor Q2, a third switching transistor Q3, and a fourth switching transistor Q4. The first rectification circuit 102 is a full-wave rectification circuit formed by the body diode of the first switching transistor Q1, the body diode of the second switching transistor Q2, the body diode of the third switching transistor Q3, and the body diode of the fourth switching transistor Q4. The first filter capacitor group 104 includes a first capacitor C1. The second switching transistor group 106 includes a fifth switching transistor Q5 and a sixth switching transistor Q6. The second rectification circuit 105 is a bridge rectifier D. The second filter capacitor group 107 includes a third capacitor C3 and a fourth capacitor C4.

The anode of the rechargeable battery B is connected to the cathode of the rechargeable battery B via the first switching transistor Q1 and the second switching transistor Q2. The anode of the rechargeable battery B is also connected to the cathode of the rechargeable battery B via the third switching transistor Q3 and the fourth switching transistor Q4. An intersection of the first switching transistor Q1 and the second switching transistor Q2 is connected to a dotted terminal of the primary winding of the isolation transformer 101. An intersection of the third switching transistor Q3 and the fourth switching transistor Q4 is connected to a non-dotted terminal of the primary winding of the isolation transformer 101. The first capacitor C1 is connected between the anode and the cathode of the rechargeable battery B.

A dotted terminal of the secondary winding of the isolation transformer 101 is connected to a positive input terminal I+ of the bridge rectifier D. A non-dotted terminal of the secondary winding of the isolation transformer 101 is connected to a negative input terminal I− of the bridge rectifier D. A positive output terminal O+ of the bridge rectifier D is connected to a negative output terminal O− of the bridge rectifier D via the fifth switching transistor Q5 and then the sixth switching transistor Q6, with an intersection of the fifth switching transistor Q5 and the sixth switching transistor Q6 connected to the non-dotted terminal of the secondary winding of the isolation transformer 101. The positive output terminal O+ of the bridge rectifier D is connected to the negative output terminal O− of the bridge rectifier D via the third capacitor C3 and then the fourth capacitor C4, with an intersection of the third capacitor C3 and the fourth capacitor C4 connected to a center tap of the secondary winding of the isolation transformer 101.

Figure 10:
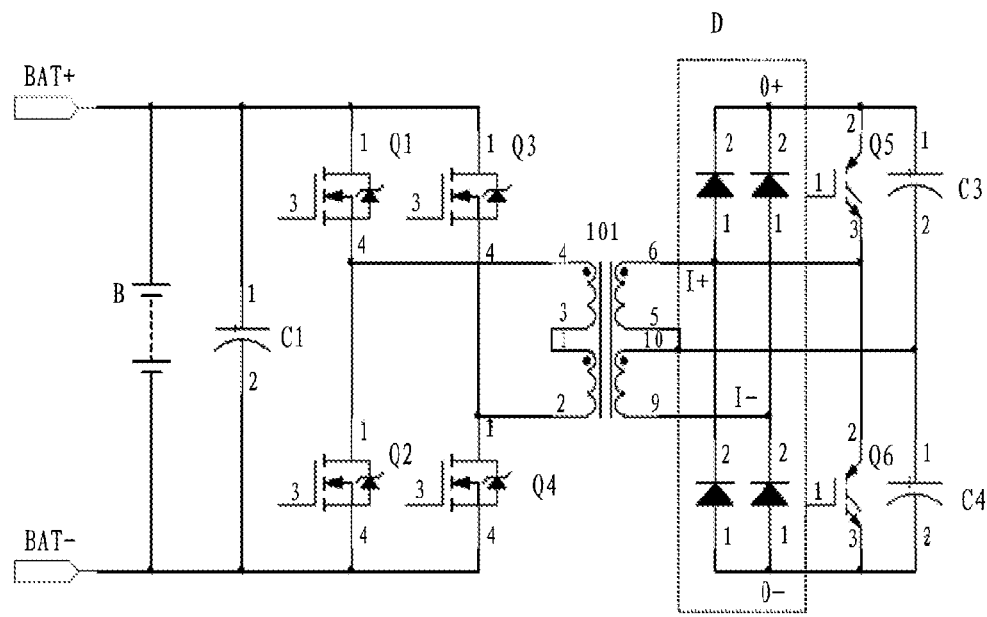
FIG. 10 is a circuit diagram illustrating a second preferred embodiment of FIG. 8.

FIG. 10 is a circuit diagram illustrating a second preferred embodiment of FIG. 8.

The second preferred embodiment differs from the first preferred embodiment shown in FIG. 9 in that: the intersection of the fifth switching transistor Q5 and the sixth switching transistor Q6 is connected to the dotted terminal of the secondary winding of the isolation transformer 101.

Figure 11:
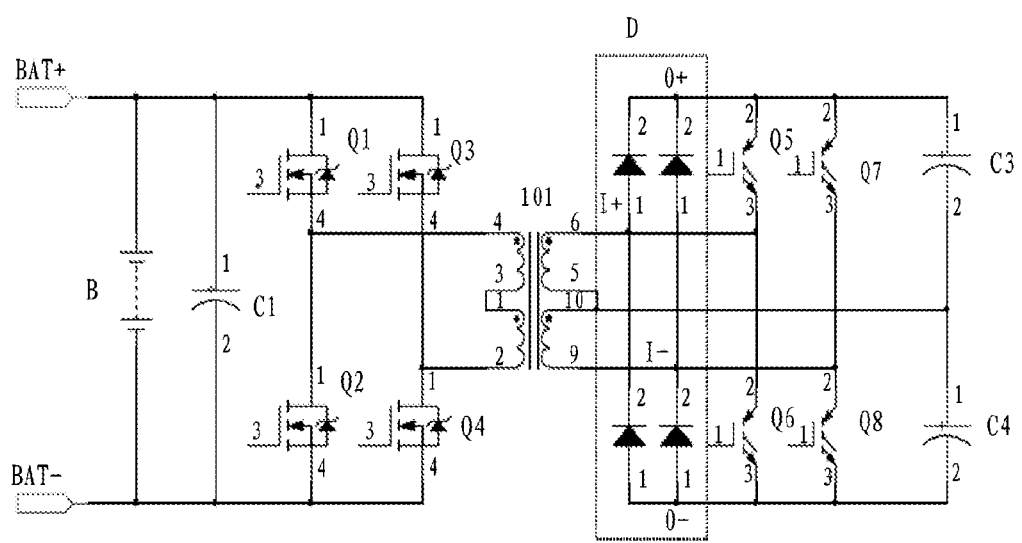
FIG. 11 is a circuit diagram illustrating a third preferred embodiment of FIG. 8.

FIG. 11 is a circuit diagram illustrating a third preferred embodiment of FIG. 8.

The third preferred embodiment differs from the second embodiment shown in FIG. 10 in that: the second switching transistor group 106 further includes a seventh switching transistor Q7 and an eighth switching transistor Q8. The positive output terminal O+ of the bridge rectifier D is connected to the negative output terminal Q− of the bridge rectifier D via the seventh switching transistor Q7 and then the eighth switching transistor Q8, with an intersection of the seventh switching transistor Q7 and the eighth switching transistor Q8 connected to the non-dotted terminal of the secondary winding of the isolation transformer 101.

Figure 12:
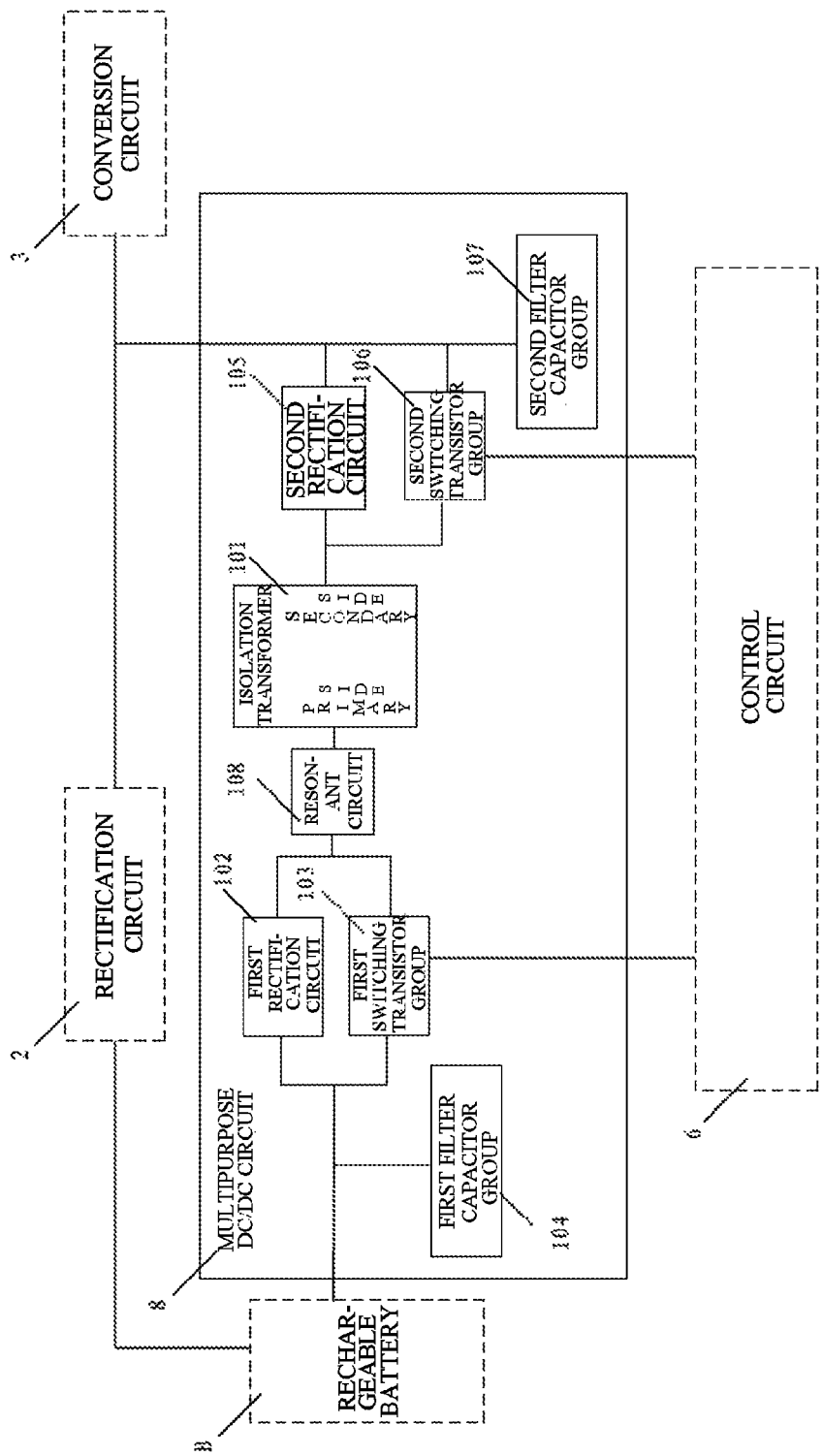
FIG. 12 is a block diagram illustrating a multipurpose DC/DC circuit according to a third embodiment of the present invention.

FIG. 12 is a block diagram illustrating a multipurpose DC/DC circuit according to a third embodiment of the present invention.

In the third embodiment, the multipurpose DC/DC circuit 8 includes an isolation transformer 101. A primary side of the isolation transformer 101 is provided with a first switching transistor group 103, a first filter capacitor group 104, a first rectification circuit 102, and a resonant circuit 108. A secondary side of the isolation transformer 101 is provided with a second switching transistor group 106, a second rectification circuit 105, and a second filter capacitor group 107.

Specifically, the output terminal of the rechargeable battery B is connected to the primary side of the isolation transformer 101 via the first rectification circuit 102 and the resonant circuit 108. Meanwhile, the output terminal of the rechargeable battery B is also connected to the primary side of the isolation transformer 101 via the first switching transistor group 103 and the resonant circuit 108. The first filter capacitor group 104 is connected to the output terminal of the rechargeable battery B. The secondary side of the isolation transformer 101 is connected to the input terminal of the conversion circuit 3 via the second rectification circuit 105. Meanwhile, the secondary side of the isolation transformer 101 is also connected to the input terminal of the conversion circuit 3 via the second switching transistor group 106. The second filter capacitor group 107 is connected to the input terminal of the conversion circuit 3.

In the battery mode, the control circuit 6 controls the first switching transistor group 103 to be rapidly switched between on and off, so that an output voltage of the rechargeable battery B is converted via the resonant circuit 108 into a first AC voltage, which is applied to the primary side of the isolation transformer 101, resulting in a second AC voltage on the secondary side of the isolation transformer 101. At the same time, the control circuit 6 controls the second switching transistor group 106 to be turned off, so that the second AC voltage is converted into a DC voltage via the second rectification circuit 105 and the second filter capacitor group 107, to supply an input voltage to the inversion circuit 3.

In the mains power mode, the control circuit 6 controls the second switching transistor group 106 to be rapidly switched between on and off, so that an output voltage of the rectification circuit 2 is converted into a third AC voltage, which is applied to the secondary side of the isolation transformer 101, resulting in a fourth AC voltage on the primary side of the isolation transformer 101. The fourth AC voltage is converted into a DC voltage via the resonant circuit 108, the first rectification circuit 102 and the first filter capacitor group 104, to charge the rechargeable battery B. In this embodiment, the resonant circuit 108 can improve the power factor.

Figure 13:
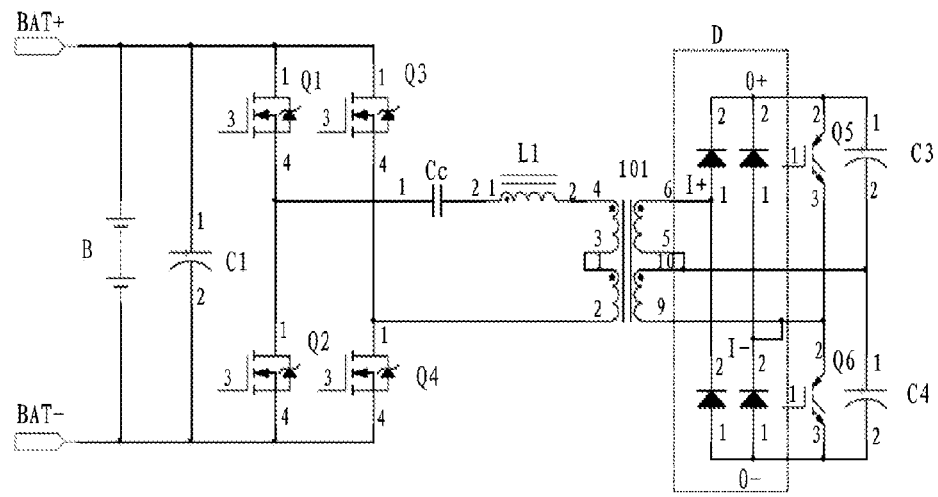
FIG. 13 is a circuit diagram illustrating a first preferred embodiment of FIG. 12.

FIG. 13 is a circuit diagram illustrating a first preferred embodiment of FIG. 12.

As shown in FIG. 13 and FIG. 12, in the first preferred embodiment, the first switching transistor group 103 includes a first switching transistor Q1, a second switching transistor Q2, a third switching transistor Q3, and a fourth switching transistor Q4. The first rectification circuit 102 is a full-wave rectification circuit formed by the body diode of the first switching transistor Q1, the body diode of the second switching transistor Q2, the body diode of the third switching transistor Q3, and the body diode of the fourth switching transistor Q4. The first filter capacitor group 104 includes a first capacitor C1. The resonant circuit 108 includes a charging capacitor Cc and an induction coil L1. The second switching transistor group 106 includes a fifth switching transistor Q5 and a sixth switching transistor Q6. The second rectification circuit 105 is a bridge rectifier D.

The second filter capacitor group 107 includes a third capacitor C3 and a fourth capacitor C4.

The anode of the rechargeable battery B is connected to the cathode of the rechargeable battery B via the first switching transistor Q1 and the second switching transistor Q2. The anode of the rechargeable battery B is also connected to the cathode of the rechargeable battery B via the third switching transistor Q3 and the fourth switching transistor Q4. An intersection of the first switching transistor Q1 and the second switching transistor Q2 is connected to a dotted terminal of the primary winding of the isolation transformer 101 via the charging capacitor Cc and then the induction coil L1. An intersection of the third switching transistor Q3 and the fourth switching transistor Q4 is connected to a non-dotted terminal of the primary winding of the isolation transformer 101. The first capacitor C1 is connected between the anode and the cathode of the rechargeable battery B.

A dotted terminal of the secondary winding of the isolation transformer 101 is connected to a positive input terminal I+ of the bridge rectifier D. A non-dotted terminal of the secondary winding of the isolation transformer 101 is connected to a negative input terminal I− of the bridge rectifier D. A positive output terminal O+ of the bridge rectifier D is connected to a negative output terminal O− of the bridge rectifier D via the fifth switching transistor Q5 and then the sixth switching transistor Q6, with an intersection of the fifth switching transistor Q5 and the sixth switching transistor Q6 connected to the non-dotted terminal of the secondary winding of the isolation transformer 101. The positive output terminal O+ of the bridge rectifier D is connected to the negative output terminal O− of the bridge rectifier D via the third capacitor C3 and then the fourth capacitor C4, with an intersection of the third capacitor C3 and the fourth capacitor C4 connected to a center tap of the secondary winding of the isolation transformer 101.

Figure 14:
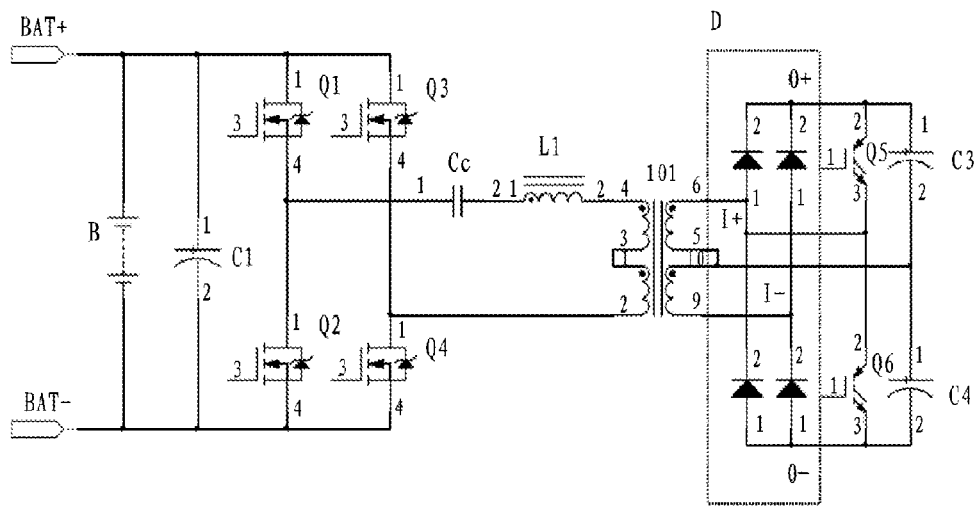
FIG. 14 is a circuit diagram illustrating a second preferred embodiment of FIG. 12.

FIG. 14 is a circuit diagram illustrating a second preferred embodiment of FIG. 12.

The second preferred embodiment differs from the first preferred embodiment shown in FIG. 13 in that:

the intersection of the fifth switching transistor Q5 and the sixth switching transistor Q6 is connected to the dotted terminal of the secondary winding of the isolation transformer 101.

Figure 15:
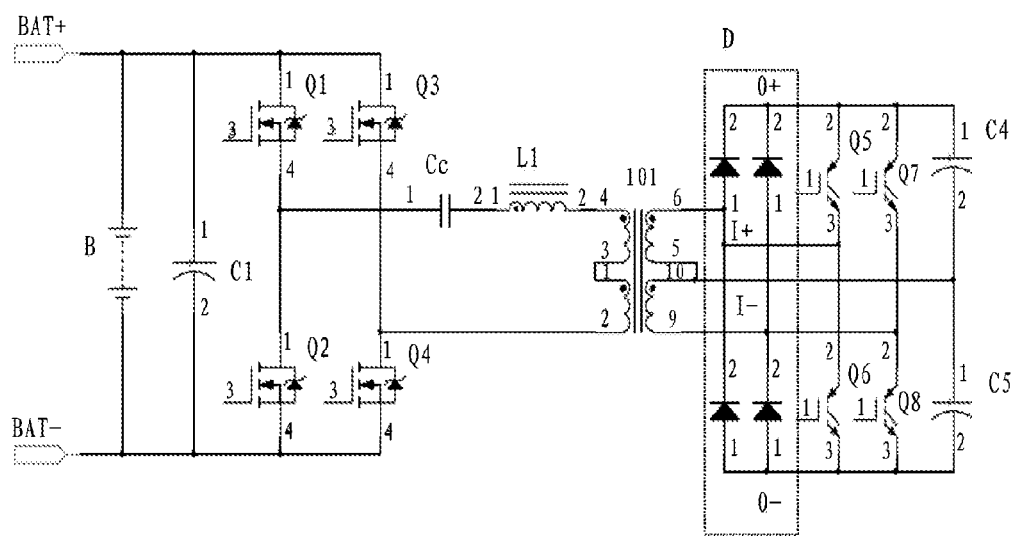
FIG. 15 is a circuit diagram illustrating a third preferred embodiment of FIG. 12.

FIG. 15 is a circuit diagram illustrating a third preferred embodiment of FIG. 12.

The third preferred embodiment differs from the second preferred embodiment shown in FIG. 14 in that: the second switching transistor group 106 further includes a seventh switching transistor Q7 and an eighth switching transistor Q8. The positive output terminal O+ of the bridge rectifier D is connected to the negative output terminal Q− of the bridge rectifier D via the seventh switching transistor Q7 and then the eighth switching transistor Q8, with an intersection of the seventh switching transistor Q7 and the eighth switching transistor Q8 connected to the non-dotted terminal of the secondary winding of the isolation transformer 101.

In the above embodiments of the present invention, any one or more of the first switching transistor Q1, the second switching transistor Q2, . . . , and the eighth switching transistor Q8 may be an IGBT, or a MOSFET, or any other switching transistor. The control circuit 6 can adjust charging and discharging voltage/current by adjusting duty cycles of switching on/off of those switching transistors.

The present invention also provides a UPS including a rechargeable battery and a UPS control circuit connected with the rechargeable battery. The UPS control circuit may be any one of the above UPS control circuits, the details of which are omitted here.

Embodiments of the present invention are described above, which shall not be considered limiting the present invention. Any alternations, modifications and equivalents made without deviation from the spirit and principle of the present invention shall fall within the scope of protection of the present invention.

What is claimed is:

1. An uninterruptable power supply (UPS) circuit connected with a rechargeable battery, the UPS circuit comprising an input filtering circuit, a rectification circuit, an inversion circuit, a static transfer switch, an output filtering circuit, and a control circuit, wherein:
the input filtering circuit, the rectification circuit, the inversion circuit, the static transfer switch, and the output filtering circuit are connected sequentially;
an output terminal of the input filtering circuit is connected with an input terminal of the static transfer switch;
the rectification circuit, the inversion circuit, and the static transfer switch are controlled by the control circuit;
the UPS circuit further comprises a multipurpose DC/DC circuit connected between an output terminal of the rectification circuit and the rechargeable battery;
the multipurpose DC/DC circuit is connected with and controlled by the control circuit, such that
in a battery mode, the rechargeable battery supplies an input voltage to the inversion circuit via the multipurpose DC/DC circuit, and
in a mains power mode, the rechargeable battery is charged by an output voltage of the rectification circuit via the multipurpose DC/DC circuit;
the multipurpose DC/DC circuit comprises a battery/mains power selector switch and an isolation transformer;
a primary side of the isolation transformer is provided with a first switching transistor group, a first rectification circuit, and a first filter capacitor group;
a secondary side of the isolation transformer is provided with a second switching transistor group, a second rectification circuit, and a second filter capacitor group;
when the battery mode is selected by the battery/mains power selector switch,
the control circuit controls the first switching transistor group to be rapidly switched between on and off, such that an output voltage of the rechargeable battery is converted into a first AC voltage, which is applied to the primary side of the isolation transformer resulting in a second AC voltage on the secondary side of the isolation transformer, and
at a same time, the control circuit controls the second switching transistor group to be turned off, such that the second AC voltage is converted into a DC voltage via the second rectification circuit and the second filter capacitor group, to supply an input voltage to the inversion circuit;
when the mains power mode is selected by the battery/mains power selector switch,
the control circuit controls the second switching transistor group to be rapidly switched between on and off, such that an output voltage of the rectification circuit is converted into a third AC voltage, which is applied to the secondary side of the isolation transformer resulting in a fourth AC voltage on the primary side of the isolation transformer, and the fourth AC voltage is converted into a DC voltage via the first rectification circuit and the first filter capacitor group to charge the rechargeable battery;
the first switching transistor group comprises a first switching transistor and a second switching transistor;
each of the first switching transistor and the second switching transistor comprises a body diode;
the first rectification circuit is a half-wave rectification circuit formed by the body diode of the first switching transistor and the body diode of the second switching transistor;
the first filter capacitor group comprises a first capacitor;
the second switching transistor group comprises a third switching transistor and a fourth switching transistor;
the second rectification circuit is a bridge rectifier;
the second filter capacitor group comprises a third capacitor and a fourth capacitor;
an anode of the rechargeable battery is connected to a center tap of the primary winding of the isolation transformer via the battery/mains power selector switch;
a cathode of the rechargeable battery is connected to (i) a dotted terminal of the primary winding of the isolation transformer via the first switching transistor, and (ii) a non-dotted terminal of the primary winding of the isolation transformer via the second switching transistor;
the first capacitor is connected between the center tap of the primary winding of the isolation transformer and the cathode of the rechargeable battery;
a dotted terminal of the secondary winding of the isolation transformer is connected to a first input terminal of the bridge rectifier;
a non-dotted terminal of the secondary winding of the isolation transformer is connected to a second input terminal of the bridge rectifier;
a positive output terminal of the bridge rectifier is connected to a negative output terminal of the bridge rectifier via the third switching transistor and then the fourth switching transistor with an intersection of the third switching transistor and the fourth switching transistor connected to the non-dotted terminal or the dotted terminal of the secondary winding of the isolation transformer; and
the positive output terminal of the bridge rectifier is also connected to the negative output terminal of the bridge rectifier via the third capacitor and then the fourth capacitor with an intersection of the third capacitor and the fourth capacitor connected to a center tap of the secondary winding of the isolation transformer.

2. The UPS control circuit according to claim 1, wherein:
the second switching transistor group further includes a fifth switching transistor and a sixth switching transistor; and
the positive output terminal of the bridge rectifier is connected to the negative output terminal of the bridge rectifier via the fifth switching transistor and then the sixth switching transistor with an intersection of the fifth switching transistor and the sixth switching transistor connected to the non-dotted terminal of the secondary winding of the isolation transformer.

3. An uninterruptable power supply (UPS) circuit connected with a rechargeable battery, the UPS circuit comprising an input filtering circuit, a rectification circuit, an inversion circuit, a static transfer switch, an output filtering circuit, and a control circuit, wherein:
the input filtering circuit, the rectification circuit, the inversion circuit, the static transfer switch, and the output filtering circuit are connected sequentially;
an output terminal of the input filtering circuit is connected with an input terminal of the static transfer switch;
the rectification circuit, the inversion circuit, and the static transfer switch are controlled by the control circuit;
the UPS circuit further comprises a multipurpose DC/DC circuit connected between an output terminal of the rectification circuit and the rechargeable battery;
the multipurpose DC/DC circuit is connected with and controlled by the control circuit, such that
in a battery mode, the rechargeable battery supplies an input voltage to the inversion circuit via the multipurpose DC/DC circuit, and
in a mains power mode, the rechargeable battery is charged by an output voltage of the rectification circuit via the multipurpose DC/DC circuit;
the multipurpose DC/DC circuit comprises an isolation transformer;
a primary side of the isolation transformer is provided with a first switching transistor group, a first rectification circuit, and a first filter capacitor group;
a secondary side of the isolation transformer is provided with a second switching transistor group, a second rectification circuit, and a second filter capacitor group;
in the battery mode,
the control circuit controls the first switching transistor group to be rapidly switched between on and off, such that an output voltage of the rechargeable battery is converted into a first AC voltage, which is applied to the primary side of the isolation transformer, resulting in a second AC voltage on the secondary side of the isolation transformer, and
at a same time, the control circuit controls the second switching transistor group to be turned off, such that the second AC voltage is converted into a DC voltage via the second rectification circuit and the second filter capacitor group, to supply an input voltage to the inversion circuit;
in the mains power mode,
the control circuit controls the second switching transistor group to be rapidly switched between on and off, such that an output voltage of the rectification circuit is converted into a third AC voltage, which is applied to the secondary side of the isolation transformer, resulting in a fourth AC voltage on the primary side of the isolation transformer, and
the fourth AC voltage is converted into a DC voltage via the first rectification circuit and the first filter capacitor group to charge the rechargeable battery;
the first switching transistor group comprises a first switching transistor, a second switching transistor, a third switching transistor, and a fourth switching transistor;
each of the first switching transistor, the second switching transistor, the third switching transistor, and the fourth switching transistor comprises a body diode;
the first rectification circuit is a full-wave rectification circuit formed by the body diode of the first switching transistor, the body diode of the second switching transistor, the body diode of the third switching transistor, and the body diode of the fourth switching transistor;
the first filter capacitor group comprises a first capacitor;

the second switching transistor group comprises a fifth switching transistor and a sixth switching transistor;
the second rectification circuit is a bridge rectifier;
the second filter capacitor group comprises a third capacitor and a fourth capacitor;
an anode of the rechargeable battery is connected to a cathode of the rechargeable battery via the first switching transistor and the second switching transistor;
the anode of the rechargeable battery is also connected to the cathode of the rechargeable battery via the third switching transistor and the fourth switching transistor with (i) an intersection of the first switching transistor and the second switching transistor connected to a dotted terminal of the primary winding of the isolation transformer, and (ii) an intersection of the third switching transistor and the fourth switching transistor connected to a non-dotted terminal of the primary winding of the isolation transformer;
the first capacitor is connected between the anode and the cathode of the rechargeable battery;
a dotted terminal of the secondary winding of the isolation transformer is connected to a first input terminal of the bridge rectifier;
a non-dotted terminal of the secondary winding of the isolation transformer is connected to a second input terminal of the bridge rectifier;
a positive output terminal of the bridge rectifier is connected to a negative output terminal of the bridge rectifier via the fifth switching transistor and then the sixth switching transistor with an intersection of the fifth switching transistor and the sixth switching transistor connected to the non-dotted terminal or the dotted terminal of the secondary winding of the isolation transformer; and
the positive output terminal of the bridge rectifier is connected to the negative output terminal of the bridge rectifier via the third capacitor and then the fourth capacitor with an intersection of the third capacitor and the fourth capacitor connected to a center tap of the secondary winding of the isolation transformer.

4. The UPS circuit according to claim 3, wherein:
the second switching transistor group further includes a seventh switching transistor and an eighth switching transistor; and
the positive output terminal of the bridge rectifier is connected to the negative output terminal of the bridge rectifier via the seventh switching transistor and then the eighth switching transistor with an intersection of the seventh switching transistor and the eighth switching transistor connected to the non-dotted terminal of the secondary winding of the isolation transformer.

5. An uninterruptable power supply (UPS) circuit connected with a rechargeable battery, the UPS circuit comprising an input filtering circuit, a rectification circuit, an inversion circuit, a static transfer switch, an output filtering circuit, and a control circuit, wherein:
the input filtering circuit, the rectification circuit, the inversion circuit, the static transfer switch, and the output filtering circuit are connected sequentially;
an output terminal of the input filtering circuit is connected with an input terminal of the static transfer switch;
the rectification circuit, the inversion circuit, and the static transfer switch are controlled by the control circuit;
the UPS circuit further comprises a multipurpose DC/DC circuit connected between an output terminal of the rectification circuit and the rechargeable battery;

the multipurpose DC/DC circuit is connected with and controlled by the control circuit, such that
in a battery mode, the rechargeable battery supplies an input voltage to the inversion circuit via the multipurpose DC/DC circuit, and
in a mains power mode, the rechargeable battery is charged by an output voltage of the rectification circuit via the multipurpose DC/DC circuit;
the multipurpose DC/DC circuit comprises an isolation transformer;
a primary side of the isolation transformer is provided with a first switching transistor group, a first rectification circuit, a first filter capacitor group, and a resonant circuit;
a secondary side of the isolation transformer is provided with a second switching transistor group, a second rectification circuit, and a second filter capacitor group;
in the battery mode,
the control circuit controls the first switching transistor group to be rapidly switched between on and off, such that an output voltage of the rechargeable battery is converted via the resonant circuit into a first AC voltage, which is applied to the primary side of the isolation transformer resulting in a second AC voltage on the secondary side of the isolation transformer, and
at a same time, the control circuit controls the second switching transistor group to be turned off, such that the second AC voltage is converted into a DC voltage via the second rectification circuit and the second filter capacitor group, to supply an input voltage to the inversion circuit; and
in the mains power mode,
the control circuit controls the second switching transistor group to be rapidly switched between on and off, such that an output voltage of the rectification circuit is converted into a third AC voltage, which is applied to the secondary side of the isolation transformer resulting in a fourth AC voltage on the primary side of the isolation transformer, and
the fourth AC voltage is converted into a DC voltage via the resonant circuit, the first rectification circuit, and the first filter capacitor group to charge the rechargeable battery;
the first switching transistor group comprises a first switching transistor, a second switching transistor, a third switching transistor, and a fourth switching transistor;
the first filter capacitor group comprises a first capacitor;
the first rectification circuit comprises a charging capacitor and an induction coil;
the second switching transistor group comprises a fifth switching transistor and a sixth switching transistor;
the second rectification circuit is a bridge rectifier;
the second filter capacitor group comprises a third capacitor and a fourth capacitor;
an anode of the rechargeable battery is connected to a cathode of the rechargeable battery via the first switching transistor and the second switching transistor;
the anode of the rechargeable battery is also connected to the cathode of the rechargeable battery via the third switching transistor and the fourth switching transistor with an intersection of the first switching transistor and the second switching transistor connected to a dotted terminal of the primary winding of the isolation transformer via the charging capacitor and then the induction coil;

an intersection of the third switching transistor and the fourth switching transistor is connected to a non-dotted terminal of the primary winding of the isolation transformer;

the first capacitor is connected between the anode and the cathode of the rechargeable battery;

a dotted terminal of the secondary winding of the isolation transformer is connected to a first input terminal of the bridge rectifier;

a non-dotted terminal of the secondary winding of the isolation transformer is connected to a second input terminal of the bridge rectifier;

a positive output terminal of the bridge rectifier is connected to a negative output terminal of the bridge rectifier via the fifth switching transistor and then the sixth switching transistor with an intersection of the fifth switching transistor and the sixth switching transistor connected to the non-dotted terminal or the dotted terminal of the secondary winding of the isolation transformer; and the positive output terminal of the bridge rectifier is connected to the negative output terminal of the bridge rectifier via the third capacitor and then the fourth capacitor with an intersection of the third capacitor and the fourth capacitor connected to a center tap of the secondary winding of the isolation transformer.

6. An uninterruptable power supply (UPS) comprising a rechargeable battery and an UPS circuit connected with the rechargeable battery, wherein:

the UPS circuit comprises an input filtering circuit, a rectification circuit, an inversion circuit, a static transfer switch, an output filtering circuit, and a control circuit;

the input filtering circuit, the rectification circuit, the inversion circuit, the static transfer switch, and the output filtering circuit are connected sequentially;

an output terminal of the input filtering circuit is connected with an input terminal of the static transfer switch;

the rectification circuit, the inversion circuit, and the static transfer switch are controlled by the control circuit;

the UPS circuit further comprises a multipurpose DC/DC circuit connected between an output terminal of the rectification circuit and the rechargeable battery;

the multipurpose DC/DC circuit is connected with and controlled by the control circuit, such that in a battery mode, the rechargeable battery supplies an input voltage to the inversion circuit via the multipurpose DC/DC circuit, and in a mains power mode, the rechargeable battery is charged by an output voltage of the rectification circuit via the multipurpose DC/DC circuit;

the multipurpose DC/DC circuit comprises a battery/mains power selector switch and an isolation transformer;

a primary side of the isolation transformer is provided with a first switching transistor group, a first rectification circuit, and a first filter capacitor group;

a secondary side of the isolation transformer is provided with a second switching transistor group, a second rectification circuit, and a second filter capacitor group;

when the battery mode is selected by the battery/mains power selector switch, the control circuit controls the first switching transistor group to be rapidly switched between on and off, such that an output voltage of the rechargeable battery is converted into a first AC voltage, which is applied to the primary side of the isolation transformer resulting in a second AC voltage on the secondary side of the isolation transformer, and at a same time, the control circuit controls the second switching transistor group to be turned off, such that the second AC voltage is converted into a DC voltage via the second rectification circuit and the second filter capacitor group to supply an input voltage to the inversion circuit;

when the mains power mode is selected by the battery/mains power selector switch, the control circuit controls the second switching transistor group to be rapidly switched between on and off, such that an output voltage of the rectification circuit is converted into a third AC voltage, which is applied to the secondary side of the isolation transformer resulting in a fourth AC voltage on the primary side of the isolation transformer, and the fourth AC voltage is converted into a DC voltage via the first rectification circuit and the first filter capacitor group to charge the rechargeable battery;

the first switching transistor group comprises a first switching transistor and a second switching transistor;

each of the first switching transistor and the second switching transistor comprises a body diode;

the first rectification circuit is a half-wave rectification circuit formed by the body diode of the first switching transistor and the body diode of the second switching transistor;

the first filter capacitor group comprises a first capacitor;

the second switching transistor group comprises a third switching transistor and a fourth switching transistor;

the second rectification circuit is a bridge rectifier;

the second filter capacitor group comprises a third capacitor and a fourth capacitor;

an anode of the rechargeable battery is connected to a center tap of the primary winding of the isolation transformer via the battery/mains power selector switch;

a cathode of the rechargeable battery is connected to (i) a dotted terminal of the primary winding of the isolation transformer via the first switching transistor, and (ii) a non-dotted terminal of the primary winding of the isolation transformer via the second switching transistor;

the first capacitor is connected between the center tap of the primary winding of the isolation transformer and the cathode of the rechargeable battery;

a dotted terminal of the secondary winding of the isolation transformer is connected to a first input terminal of the bridge rectifier;

a non-dotted terminal of the secondary winding of the isolation transformer is connected to a second input terminal of the bridge rectifier;

a positive output terminal of the bridge rectifier is connected to a negative output terminal of the bridge rectifier via the third switching transistor and then the fourth switching transistor with an intersection of the third switching transistor and the fourth switching transistor connected to the non-dotted terminal or the dotted terminal of the secondary winding of the isolation transformer; and the positive output terminal of the bridge rectifier is also connected to the negative output terminal of the bridge rectifier via the third capacitor and then the fourth capacitor with an intersection of the third capacitor and the fourth capacitor connected to a center tap of the secondary winding of the isolation transformer.

7. The UPS according to claim 6, wherein:
the second switching transistor group further includes a fifth switching transistor and a sixth switching transistor; and
the positive output terminal of the bridge rectifier is connected to the negative output terminal of the bridge rectifier via the fifth switching transistor and then the sixth switching transistor with an intersection of the fifth switching transistor and the sixth switching transistor connected to the non-dotted terminal of the secondary winding of the isolation transformer.

8. An uninterruptable power supply (UPS) comprising a rechargeable battery and an UPS circuit connected with the rechargeable battery, wherein:
the UPS circuit comprises an input filtering circuit, a rectification circuit, an inversion circuit, a static transfer switch, an output filtering circuit, and a control circuit;
the input filtering circuit, the rectification circuit, the inversion circuit, the static transfer switch, and the output filtering circuit being connected sequentially;
an output terminal of the input filtering circuit is connected with an input terminal of the static transfer switch;
the rectification circuit, the inversion circuit, and the static transfer switch are controlled by the control circuit;
the UPS circuit further comprises a multipurpose DC/DC circuit connected between an output terminal of the rectification circuit and the rechargeable battery;
the multipurpose DC/DC circuit is connected with and controlled by the control circuit, such that
in a battery mode, the rechargeable battery supplies an input voltage to the inversion circuit via the multipurpose DC/DC circuit, and
in a mains power mode, the rechargeable battery is charged by an output voltage of the rectification circuit via the multipurpose DC/DC circuit;
the multipurpose DC/DC circuit comprises an isolation transformer;
a primary side of the isolation transformer is provided with a first switching transistor group, a first rectification circuit, and a first filter capacitor group;
a secondary side of the isolation transformer is provided with a second switching transistor group, a second rectification circuit, and a second filter capacitor group;
in the battery mode,
the control circuit controls the first switching transistor group to be rapidly switched between on and off, such that an output voltage of the rechargeable battery is converted into a first AC voltage, which is applied to the primary side of the isolation transformer resulting in a second AC voltage on the secondary side of the isolation transformer, and
at a same time, the control circuit controls the second switching transistor group to be turned off, such that the second AC voltage is converted into a DC voltage via the second rectification circuit and the second filter capacitor group to supply an input voltage to the inversion circuit;
in the mains power mode,
the control circuit controls the second switching transistor group to be rapidly switched between on and off, such that an output voltage of the rectification circuit is converted into a third AC voltage, which is applied to the secondary side of the isolation transformer resulting in a fourth AC voltage on the primary side of the isolation transformer, and
the fourth AC voltage is converted into a DC voltage via the first rectification circuit and the first filter capacitor group, to charge the rechargeable battery;
the first switching transistor group comprises a first switching transistor, a second switching transistor, a third switching transistor, and a fourth switching transistor;
each of the first switching transistor, the second switching transistor, the third switching transistor, and the fourth switching transistor comprises a body diode;
the first rectification circuit is a full-wave rectification circuit formed by the body diode of the first switching transistor, the body diode of the second switching transistor, the body diode of the third switching transistor, and the body diode of the fourth switching transistor;
the first filter capacitor group comprises a first capacitor;
the second switching transistor group comprises a fifth switching transistor and a sixth switching transistor;
the second rectification circuit is a bridge rectifier, and the second filter capacitor group comprises a third capacitor and a fourth capacitor;
an anode of the rechargeable battery is connected to a cathode of the rechargeable battery via the first switching transistor and the second switching transistor;
the anode of the rechargeable battery is also connected to the cathode of the rechargeable battery via the third switching transistor and the fourth switching transistor with (i) an intersection of the first switching transistor and the second switching transistor connected to a dotted terminal of the primary winding of the isolation transformer, and (ii) an intersection of the third switching transistor and the fourth switching transistor connected to a non-dotted terminal of the primary winding of the isolation transformer;
the first capacitor is connected between the anode and the cathode of the rechargeable battery;
a dotted terminal of the secondary winding of the isolation transformer is connected to a first input terminal of the bridge rectifier;
a non-dotted terminal of the secondary winding of the isolation transformer is connected to a second input terminal of the bridge rectifier;
a positive output terminal of the bridge rectifier is connected to a negative output terminal of the bridge rectifier via the fifth switching transistor and then the sixth switching transistor with an intersection of the fifth switching transistor and the sixth switching transistor connected to the non-dotted terminal or the dotted terminal of the secondary winding of the isolation transformer; and
the positive output terminal of the bridge rectifier is connected to the negative output terminal of the bridge rectifier via the third capacitor and then the fourth capacitor with an intersection of the third capacitor and the fourth capacitor connected to a center tap of the secondary winding of the isolation transformer.

9. The UPS according to claim 8, wherein:
the second switching transistor group further includes a seventh switching transistor and an eighth switching transistor; and
the positive output terminal of the bridge rectifier is connected to the negative output terminal of the bridge rectifier via the seventh switching transistor and then the eighth switching transistor with an intersection of the seventh switching transistor and the eighth switching transistor connected to the non-dotted terminal of the secondary winding of the isolation transformer.

10. An uninterruptable power supply (UPS) comprising a rechargeable battery and a UPS circuit connected with the rechargeable battery, wherein:

the UPS circuit comprises an input filtering circuit, a rectification circuit, an inversion circuit, a static transfer switch, an output filtering circuit, and a control circuit;

the input filtering circuit, the rectification circuit, the inversion circuit, the static transfer switch, and the output filtering circuit are connected sequentially;

an output terminal of the input filtering circuit is connected with an input terminal of the static transfer switch;

the rectification circuit, the inversion circuit, and the static transfer switch are controlled by the control circuit;

the UPS circuit further comprises a multipurpose DC/DC circuit connected between an output terminal of the rectification circuit and the rechargeable battery;

the multipurpose DC/DC circuit is connected with and controlled by the control circuit, such that
  in a battery mode, the rechargeable battery supplies an input voltage to the inversion circuit via the multipurpose DC/DC circuit, and
  in a mains power mode, the rechargeable battery is charged by an output voltage of the rectification circuit via the multipurpose DC/DC circuit;

the multipurpose DC/DC circuit comprises an isolation transformer;

a primary side of the isolation transformer is provided with a first switching transistor group, a first rectification circuit, a first filter capacitor group, and a resonant circuit;

a secondary side of the isolation transformer is provided with a second switching transistor group, a second rectification circuit, and a second filter capacitor group;

in the battery mode,
  the control circuit controls the first switching transistor group to be rapidly switched between on and off, such that an output voltage of the rechargeable battery is converted via the resonant circuit into a first AC voltage, which is applied to the primary side the isolation transformer resulting in a second AC voltage on the secondary side of the isolation transformer, and
  at a same time, the control circuit controls the second switching transistor group to be turned off, such that the second AC voltage is converted into a DC voltage via the second rectification circuit and the second filter capacitor group to supply an input voltage to the inversion circuit;

in the mains power mode,
  the control circuit controls the second switching transistor group to be rapidly switched between on and off, such that an output voltage of the rectification circuit is converted into a third AC voltage, which is applied to the secondary side of the isolation transformer resulting in a fourth AC voltage on the primary side of the isolation transformer, and
  the fourth AC voltage is converted into a DC voltage via the resonant circuit, the first rectification circuit, and the first filter capacitor group to charge the rechargeable battery;

the first switching transistor group comprises a first switching transistor, a second switching transistor, a third switching transistor, and a fourth switching transistor;

the first filter capacitor group comprises a first capacitor;

the first rectification circuit comprises a charging capacitor and an induction coil;

the second switching transistor group comprises a fifth switching transistor and a sixth switching transistor;

the second rectification circuit is a bridge rectifier;

the second filter capacitor group comprises a third capacitor and a fourth capacitor;

an anode of the rechargeable battery is connected to a cathode of the rechargeable battery via the first switching transistor and the second switching transistor;

the anode of the rechargeable battery is also connected to the cathode of the rechargeable battery via the third switching transistor and the fourth switching transistor with (i) an intersection of the first switching transistor and the second switching transistor connected to a dotted terminal of the primary winding of the isolation transformer via the charging capacitor and then the induction coil, and (ii) an intersection of the third switching transistor and the fourth switching transistor connected to a non-dotted terminal of the primary winding of the isolation transformer;

the first capacitor is connected between the anode and the cathode of the rechargeable battery;

a dotted terminal of the secondary winding of the isolation transformer is connected to a first input terminal of the bridge rectifier;

a non-dotted terminal of the secondary winding of the isolation transformer is connected to a second input terminal of the bridge rectifier;

a positive output terminal of the bridge rectifier is connected to a negative output terminal of the bridge rectifier via the fifth switching transistor and then the sixth switching transistor with an intersection of the fifth switching transistor and the sixth switching transistor connected to the non-dotted terminal or the dotted terminal of the secondary winding of the isolation transformer; and the positive output terminal of the bridge rectifier is connected to the negative output terminal of the bridge rectifier via the third capacitor and then the fourth capacitor with an intersection of the third capacitor and the fourth capacitor connected to a center tap of the secondary winding of the isolation transformer.

* * * * *

UNITED STATES PATENT AND TRADEMARK OFFICE
CERTIFICATE OF CORRECTION

PATENT NO. : 9,570,930 B2  
APPLICATION NO. : 13/880002  
DATED : February 14, 2017  
INVENTOR(S) : Ni Page 1 of 1

It is certified that error appears in the above-identified patent and that said Letters Patent is hereby corrected as shown below:

On the Title Page

Item (73), Assignee, Delete "Emerson Netwrok Power Co., Ltd." and insert --Emerson Network Power Co., Ltd.--.

Signed and Sealed this  
Thirteenth Day of June, 2017

Joseph Matal  
*Performing the Functions and Duties of the  
Under Secretary of Commerce for Intellectual Property and  
Director of the United States Patent and Trademark Office*